US008384769B1

(12) United States Patent
Hong et al.

(10) Patent No.: US 8,384,769 B1
(45) Date of Patent: Feb. 26, 2013

(54) 3D IMAGE DISPLAY METHOD AND SYSTEM THEREOF

(75) Inventors: Suk-Pyo Hong, Seongnam-si (KR); Yong-Seok Oh, Busan (KR); Dong-Hak Shin, Busan (KR); Eun-Soo Kim, Seoul (KR); Seung-Cheol Kim, Seoul (KR)

(73) Assignee: Kwangwoon University Research Institute for Industry Cooperation, Seoul (KR)

( * ) Notice: Subject to any disclaimer, the term of this patent is extended or adjusted under 35 U.S.C. 154(b) by 1260 days.

(21) Appl. No.: 12/126,791

(22) Filed: May 23, 2008

(30) Foreign Application Priority Data

May 23, 2007 (KR) .................. 10-2007-0050558
Oct. 1, 2007 (KR) .................. 10-2007-0098961
Apr. 17, 2008 (KR) .................. 10-2008-0035640

(51) Int. Cl.
*H04N 13/04* (2006.01)

(52) U.S. Cl. .................. 348/51; 348/E13.029; 348/744; 353/28; 382/154; 382/173; 345/6; 345/626

(58) Field of Classification Search .................. 348/51, 348/744, E13.029; 345/6, 626; 359/619
See application file for complete search history.

(56) References Cited

U.S. PATENT DOCUMENTS

| 6,045,229 | A | * | 4/2000 | Tachi et al. ............... 353/28 |
| 6,157,733 | A | * | 12/2000 | Swain ............... 382/154 |
| 2004/0041747 | A1 | * | 3/2004 | Uehara et al. ............... 345/6 |
| 2006/0152812 | A1 | * | 7/2006 | Woodgate et al. ............ 359/619 |
| 2008/0266321 | A1 | * | 10/2008 | Aufranc et al. ............... 345/626 |

FOREIGN PATENT DOCUMENTS

| JP | 1993-142982 A | 6/1993 |
| JP | 1998-239629 A | 9/1998 |
| JP | 2005-026772 A | 1/2005 |
| JP | 2006-098775 A | 4/2006 |
| JP | 2006-146597 A | 6/2006 |

OTHER PUBLICATIONS

Japanese Office Action for Japanese Patent Application No. 2008-136055 dated Jun. 1, 2010 by Japanese Patent Office.

* cited by examiner

*Primary Examiner* — Kyung H Shin
(74) *Attorney, Agent, or Firm* — Knobbe, Martens, Olson & Bear, LLP

(57) ABSTRACT

A three-dimensional image display method is disclosed. The three-dimensional image display method in accordance with an embodiment of the present invention includes: displaying an object image; displaying a background image by using a three-dimensional image display method; and disposing the object image at a close distance and the background image at a far distance such that the object image and the background image overlap inside a same viewing angle. By using images having a different sense of depth, a high-resolution image can be displayed while providing a sense of reality.

13 Claims, 17 Drawing Sheets

3D IMAGE DISPLAY METHOD AND SYSTEM THEREOF

CROSS-REFERENCE TO RELATED PATENT APPLICATIONS

This application claims the benefit of Korean Patent Application Nos. 10-2007-0050558, filed on May 23, 2007, 10-2007-0098961, filed on Oct. 1, 2007, and 10-2008-0035640, filed on Apr. 17, 2008, in the Korean Intellectual Property Office, the disclosure of which is incorporated herein in its entirety by reference.

BACKGROUND OF THE INVENTION

1. Field of the Invention

The present invention relates to a system and method of displaying a 3D image, more specifically to a 3D image display method, and a system thereof, having a background image for adding three-dimensionality.

2. Background Art

There have been a number of researches and developments on three-dimension imagery and image display technologies. As a new concept of virtual image media that will enhance the technological level of visual information, the three-dimensional image-related media are expected to lead the new generation of display technology. Consequently, academic institutions and industry researchers, both in Korean and overseas, are actively actively researching in this field.

Three-dimensional images are more realistic and natural than two-dimensional images, and are increasingly preferred to their two-dimensional predecessors. While the conventional two-dimensional display system provided an image on a flat plane, the three-dimensional display system provides the inherent, real image information of an object to an observer. In such sense, the three-dimensional display system is an ultimate image display technology.

For the display of such three-dimensional images, stereoscopy, holography and integral imaging have been developed.

In the stereoscopy method, which imitates the human visual system, images corresponding to the left eye and the right eye, respectively, are separately inputted. An image is separated into a left-eye image and a right-eye image, which are then inputted to the left eye and the right eye, respectively, of an observer, who is wearing polarized glasses.

The holography method allows an observer to experience a real-like three-dimensional image, without wearing any special glasses, when looking at the holography created by use of laser. With its high three-dimensionality, the holography method is known to be least physically demanding to the observer, hence the most ideal method for realizing three-dimensional imagery.

The integral imaging display method is mainly divided into image pick-up and image display. The image pick-up process is arranged by a two-dimensional sensor, such as an image sensor, and a lens array, before which a three-dimensional object is placed. A variety of information on the three-dimensional object is passed through the lens array and stored in the two-dimensional sensor. As an element image, the stored image is used for displaying the image three-dimensionally. A reverse process of the image pick-up process, the image display process of the integral imaging display method is arranged by an image display device, such as a liquid crystal display device, and a lens array. The element image obtained by the image pick-up process is displayed on the image display device, and the image information of the element image is passed through the lens array and displayed in space three-dimensionally.

A type of glass-less 3D display technology, the floating display system can be often found in museums or exhibition showcases.

Simple in the structure, the floating-image display system is easy to realize a high-resolution image in real space. Once an image from a flat display device, such as an LCD, passes through a floating lens, which uses a convex lens or a concave mirror, the image is formed in space, and the viewer can see the image floating in space in front of his or her eyes. The image displayed by the floating-image display system, however, is limited to a single real plane, hindering the system from displaying the image three-dimensionally.

The above 3D display methods, however, require an enormous amount of data to process a near-perfect sense of three-dimensionality, because they realize the 3D imagery from a single 2D or 3D image, and thus are unable to provide consecutive 3D images. Moreover, the three-dimensionality that a user senses has been somewhat limited when the 3D image is provided by a single system.

SUMMARY OF CERTAIN INVENTIVE ASPECTS

One aspect of the present invention is a 3D image display method, and a system thereof, having a background image.

Another aspect of the present invention is a 3D image display method, and the system thereof, which can render a more real-like three-dimensional image by solving the overlapping region problem, which is often occurred when two or more real planes are used in a 3D image display system.

Another aspect of the present invention is a 3D image display method, and a system thereof, which can solve the problem of deteriorated resolution when the image is realized by a three-dimensional image display method only, by displaying a 3D background image through the use of a three-dimensional image display method and by displaying a 3D image through a separate display of a high-resolution object image.

Another aspect of the present invention is a floating-image display method, and a system thereof, which can implement a more real-like background image by additionally using a 3D background image.

An aspect of the present invention features a 3D image display method.

The three-dimensional image display method in accordance with an embodiment of the present invention includes: displaying an object image; displaying a background image by using a three-dimensional image display method; and disposing the object image at a close distance and the background image at a far distance such that the object image and the background image overlap inside a same viewing angle.

In the step of disposing the object image and the background image, one of the object image and background image can be formed as a real image and the other can be formed as a virtual image, by using a half mirror, which permeates one of the object image and background image and reflects the other.

The object image can be reflected on the half mirror and formed as a virtual image on an opposite side of the half mirror.

In the step of displaying the background image, the background image can be projected to a lens array and displayed as an element image.

The step of displaying the background image can include: generating a mask image corresponding to the object image;

combining the background image with the mask image; and projecting the combined image to a lens array and displaying the combined image as an element image.

An element image of the mask image can be treated black.

The step of displaying the background image can include: outputting the background image as a left image and a right image, the left image and the right image having complementary colors with each other; and using a color difference method to display the background image, the color difference method comprising the step of separating the left image and right image of complementary colors by using eye-glasses with color filters.

The complementary colors of the left image and right image can be red and green, respectively.

The step of displaying the background image can use a polarization method to display the background image. The polarization method separates a left image and a right image of the background image by using polarized eye-glasses, which have a left lens and a right lens that have different polarizing directions from each other.

The polarized eye-glasses can use the difference in oscillation direction of linear polarization or the difference in rotation direction of circular polarization.

The step of displaying the background image can include: repeatedly outputting the background image periodically as a left image and a right image, the left image and the right image having different parallax; and using a time-division method to display the background image, the time-division method comprising the step of separating the left image and the right image through an electronic shutter synchronized with the repeated period.

The step of displaying the background image can include using a head mount display (HMD) method to display the background image. The HMD method provides three-dimensionality by placing a display device on the head and placing a screen right in front of the eye.

The step of displaying the background image can include: outputting a left image and a right image alternately on a display panel of the background image; and using a parallax barrier method to display the background image. The parallax barrier method includes the step of separating the left image and the right image through a barrier placed at a distance from the display panel.

The step of displaying the background image can include: outputting a left image and a right image and arranging the left image and the right image alternately on a display panel of the background image; and using a lenticular method to display the background image. The lenticular method includes the step of separating the left image and the right image through a half-round cylindrical shape lenticular placed at a distance from the display panel.

The step of displaying the background image can include: outputting a plurality of pairs of left and right images by alternately arranging the left image and the right image on a display panel of the background image; and using a multi-view method to display the background image. The multi-view method includes the step of separating the left image and the right image as a plurality of point-of-views through a barrier placed at a distance from the display panel.

In the step of displaying the object image, the lens can be a convex lens or a concave mirror.

In the step of displaying the key image, the lens can be a plurality of convex lenses or a plurality of concave mirrors.

Another aspect of the present invention features a recorded medium.

The recorded medium in accordance with an embodiment of the present invention tangibly embodies a program of instructions executable by a digital processing apparatus to execute a three-dimensional display method recited in at least one of the claims, and the program is readable by the digital processing apparatus.

Yet another aspect of the present invention features a three-dimensional image display system.

The three-dimensional image display system in accordance with an embodiment of the present invention can include: an object image display system unit, displaying an object image; an integral image display system unit, displaying a background image as an element image; and optical means disposing the object image at a close distance and the background image at a far distance such that the object image and the background image overlap inside a same viewing angle.

The integral image display system unit can include a lens array, and the integral image display system unit can display the background image by projecting the element image on the lens array.

The object image display system unit can include: a display panel, displaying the object image on a panel; and a floating lens, which is a convex lens or a concave lens. An image displayed on the display panel can be floating-displayed by being projected to the floating lens.

The floating lens can be a plurality of convex lenses of a plurality of concave mirrors.

The floating-image display system unit can include a lens, which allows an object image displayed on the display panel to be formed at a distance H. The distance H can be computed through a formula $$H = \frac{hf_1}{h - f_1},$$

whereas h is the distance between the display panel and the lens, fl is the focal length of the lens, and H is the distance of a location on which the object image is formed.

The integral image display system unit can include: a display panel, on which a background image is displayed; and a lens array, placed at the front of the display panel. The background image can be projected to the lens array and displayed as an element image.

The optical means can be a half mirror, which permeates one of the object image and background image and reflects the other.

The half mirror can reflect the object image, and the object image can be formed as a virtual image on an opposite side of the half mirror.

BRIEF DESCRIPTION OF THE DRAWINGS

Embodiments of the present invention will be described with reference to accompanying drawings where:

FIG. 13 shows how the background image is displayed using a parallax barrier method in accordance with another embodiment of the present invention;

FIG. 14 shows how the background image is displayed using a lenticular method in accordance with another embodiment of the present invention;

DESCRIPTION OF CERTAIN INVENTIVE EMBODIMENTS

Figure 1:
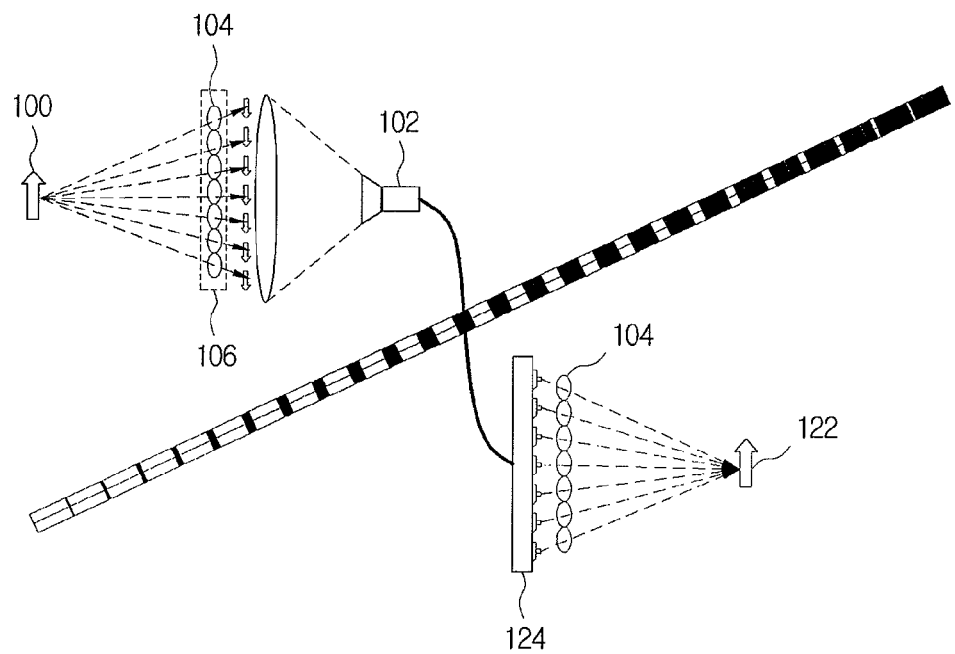
FIG. 1 shows how an integral imaging display method works.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain technology is determined to evade the point of the present invention, the pertinent detailed description will be omitted.

Referring to FIGS. 1 to 11, a 3D image display system with a background image using an integral image display method in accordance with an embodiment of the present invention will be described. Referring to FIG. 12 and thereafter, a 3D image display system with a background image in accordance with other embodiments of the present invention will be described.

Figure 2:
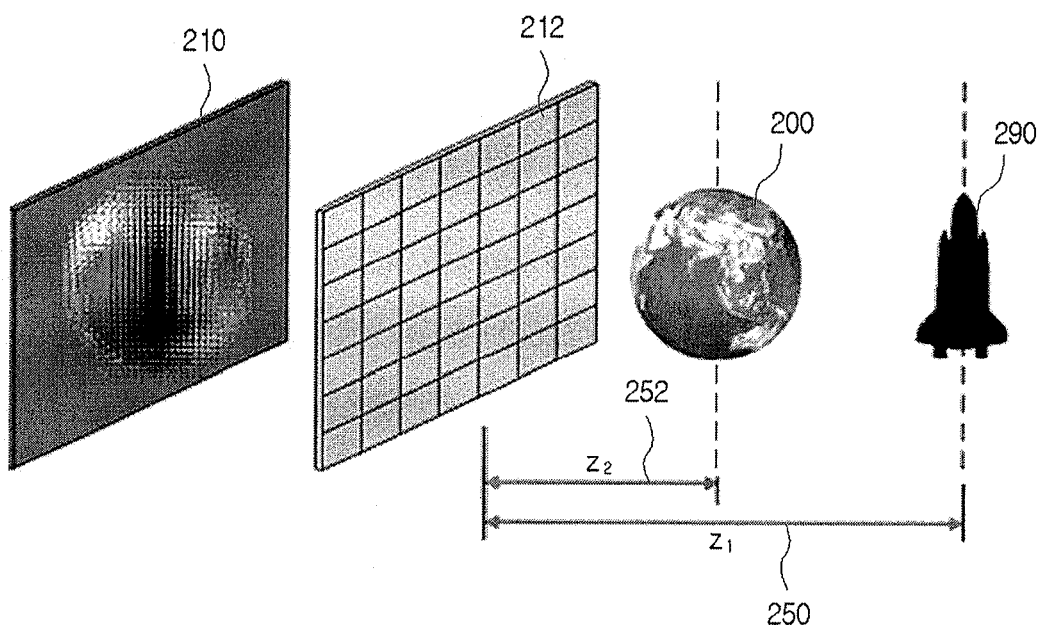
FIG. 2 shows how an overlap-removed background element image used in a 3D image display system is created in accordance with an embodiment of the present invention.

Firstly, FIGS. 1 and 2 will be used to describe how a background image is displayed as an integral image and then how this is disposed within the viewing angle such that the integral image is overlapped with an object image. The object image is formed as a virtual image if a translucent mirror is used only and as a real image if a floating-image display method is used. This will be described with reference to FIGS. 3 and 6.

FIG. 1 shows how an integral image display method works. The integral image display method consists of a pick-up process and a display process, as illustrated in FIG. 1. In the pick-up process, element images are obtained using element lenses 104 from a 3D object 100. Each element image has a different parallax in accordance with the location of the corresponding element lens 104. The element image having a different parallax refers to an image obtained from a different point of view of the 3D object 100.

The pick-up process uses a lens array 106, in which the element lenses 104 are arranged one-dimensionally or two-dimensionally, to extract element images having different parallaxes from the 3D object 100.

Therefore, after the element images are picked up using the lens array 106, different images of the 3D object, viewed from different angles, are stored as element images through the lens array 106. For example, if a lens array having lenslets of 52×52 is used, element images are obtained for 2,704 lenslets.

In the display process, these element images are integrated through the lens array 106 to be displayed as a 3D image. The types of element images will be described later with reference to FIG. 10.

FIG. 2 shows how an overlap-removed background element image used in the 3D image display system unit is created in accordance with an embodiment of the present invention.

The 3D image display system in accordance with an embodiment of the present invention can include an object image display system unit and an integral image display system unit, as will be described later. The object image display system unit and the integral image display system unit output their respective independent image. The object image will be described later with reference to FIGS. 3 and 6.

Hereinafter, FIG. 2 will be referenced to describe the process of creating an overlap-removed background image by use of the pick-up process of integral image, which has been described with reference to FIG. 1.

Firstly, the integral image display system unit can include an input panel 210 and a lens array 212. The input panel can be a CMOS image sensor or a CCD image sensor. In case there is an object at the front of the input panel 210, the image of the object is stored in the input panel 210.

However, as the lens array 212 is disposed at the front of the input panel 210, light emitted or reflected from the object at the front will be inputted to the input panel 210 through the lens array 212.

For instance, the object can be a globe 200, spaced by Z2 252 from the lens array. The globe 200 is the base of an image to be used as a background of a 3D image, which will be described later with reference to FIG. 3, and is an image before it is picked up as an element image. A space shuttle 290, which is spaced at a distance of Z1 250 from the lens array 212, is a silhouette of an image to be used as the object. That is, the space shuttle 290 is a mask image, in which the inside of the image to be used as an object is treated black.

The images 200 and 290 are placed at locations of Z2 252 and Z1 205, respectively, by use of an LCD panel (not shown) on which the globe is displayed and an LCD panel (not shown) on which the space shuttle is displayed. Each of the images can be arranged by use of a lens and a mirror (not shown).

The globe and space shuttle, placed at the distances of Z2 and Z1, are converted to element images as they pass through the lens array, and the element images are stored in the input panel 210. Since the element image stored in the input panel is overlapped with the black silhouette image of the space shuttle, the overlapping area is removed and becomes black.

Hereinafter, the background image created through this pick-up process will be referred to as an overlap-removed background image. The overlap-removed background image is stored in a memory, which is connected to the input panel 210, and can be used to display a 3D image, which will be described later.

As described above, the silhouette of the object image is removed from the background image of the globe, in order to eliminate any overlapping and occlusion region problem between the object image (space shuttle) and the background image (globe).

In other words, the overlapping region that occurs when the object image and background image are displayed at the same time is pre-removed.

As will be described with reference to FIG. 3, a user views the object image and the background image from one viewing angle, and if the object image and the background image, the overlapping region of which is not removed, are overlapped, the color of the object appears distorted.

Therefore, by pre-removing the object image from the background image (i.e., by overlapping the mask image of the object image on the background image), the overlap-removed background image is generated, preventing the object image from appearing distorted. As described earlier, the overlap-removed background image is inputted (or converted) as an element image through the lens array 212 and is stored in the input panel 210.

Figure 3:
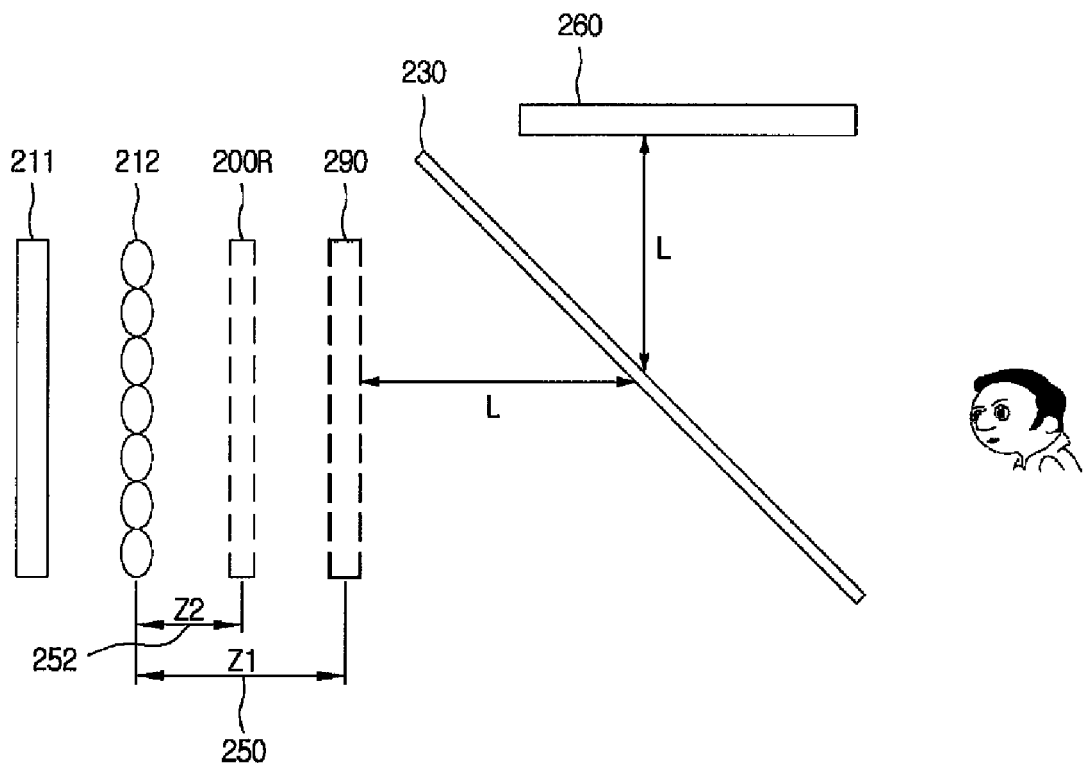
FIG. 3 shows the structures of the 3D image display system in accordance with an embodiment of the present invention.

FIG. 3 is the structure of a 3D image display system in accordance with an embodiment of the present invention.

Referring to FIG. 3, the display system can include integral image display units 211 and 212, a translucent mirror 230 and an object image display unit 260.

As described above with reference to FIG. 2, the 3D image of the present invention is recognized by a user through the use of the object image 290 and an overlap-removed background image 200R, which have different perspectives. The perspective refers to a sense of depth recognized by the user within the user's viewing angle. For example, there can be a sense of perspective if a figure appears clearly but the background image of mountain is blurry. The overlap-removed background image 200R is outputted from a display panel, and, as described with reference to FIG. 2, is combined with the mask image and inputted or stored in the input panel through the lens array as an element image.

While the pick-up process is described with reference to FIG. 2, FIG. 3 will skip the description of the pick-up process and will describe only the "display" process, in which the picked-up overlap-removed background image is outputted through the display panel (e.g., an LCD panel).

The object image 290 and overlap-removed background image 200R, which have different perspectives, are not generated from one display panel but generated from each respective display panel. However, the two images 290 and 200R are recognized by the user's eyes through the translucent mirror 230.

The object image 290 is displayed on a first display panel 260, which can be a flat display panel, such as an LCD or a PDP.

The first display panel 260 outputs light that forms the object image 290, which can be, for example, a space shuttle. The object image 290 can be the space shuttle only, without any background.

Referring to FIG. 3, the user should be able to see the space shuttle only, if the user looks at the first display panel 260 directly without seeing through the mirror.

In the 3D image display system in accordance with an embodiment of the present invention, the object image 290 is not disposed to be projected to the user directly, but the light outputted from the first display panel 260 is reflected to the translucent mirror 230 before being directed to the user.

The translucent mirror 230 reflects some of the light and allows some of the light pass through the mirror. The translucent mirror 230 can be also referred to as a half mirror or a two-way mirror.

Referring to FIG. 3, in which the user is viewing the translucent mirror from the \ right side, the translucent mirror 230 reflects the object image 290 and permeates the overlap-removed background image 200R, allowing the object image 290 and the overlap-removed background image 200R to be overlapped within the user's viewing angle. Although FIG. 3 illustrates that the user is looking at the translucent mirror 230 from the right side, it shall be evident that it is possible for the user to view the translucent mirror from the lower side. Hereinafter, however, the case of the user viewing the translucent mirror 230 from the right side will be described, for the convenience of description and understanding.

The user can view the space shuttle, which is the object image 290, through the translucent mirror 230. The space shuttle 290 that is viewed (i.e., recognized) by the user is placed at a distance of "L" on the opposite side of the translucent mirror 230. That is, the space shuttle, which is a virtual image, is recognized by the user that it is located at the distance of L on the other side of the translucent mirror 230. The translucent mirror 230 can be tilted by a predetermined angle (e.g., 45 degrees) such that the image outputted from the first display panel is reflected and projected to within the viewing angle of the user.

For a flat mirror, the image viewed by the user is always in straight up and is formed at the distance of L from an object (i.e., the first display panel in FIG. 3) in the back of the mirror.

Therefore, even though the object image, which is displayed from the first display panel 260, is distanced by L from the translucent mirror 230 at the right angle from the user's viewing line, the user recognizes that the object image is distanced by L from the translucent mirror 230 in the direction of the viewing line. This is the same principle as that of a periscope.

As described above, however, the 3D image formed by the 3D image display system of the present invention does not consist of the object image 290 only. In case there is a background image 200R having a different perspective from that of the object image, the user will recognize the image as a 3D image.

Therefore, the integral image system unit displays the overlap-removed background image 200R through a second display panel 211, which can be a flat panel display device, such as an LCD or a PDP, like the first display panel 260, and can be substituted by a projection display device.

As a light source of the overlap-removed background image 200R, the second display panel 211 outputs the overlap-removed background image 200R, and the light constituting the overlap-removed background image 200R passes through the two-dimensional lens array 212.

The light that passed through the lens array 212 passes through lenslets, which constitute the lens array 212, and forms an image at a distance of Z2 252 from the lens array 212. The overlap-removed background image 200R is, for example, a 3D integral image of the earth seen from the space.

Since it is required that the overlap-removed background image 200R is formed with a different depth from that of the object image 290, the overlap-removed background image 200R must be placed at a distance separated by Z1-Z2 from the object image 290. That is, the overlap-removed background image 200R is recognized by the user that it is placed behind the object image 290.

Although the overlap-removed background image 200R is distanced by Z2 from the lens array 212 in FIG. 3 for the convenience of illustration, it is also possible that the overlap-removed background image 200R is formed as a virtual image, depending on the radius of curvature or the location of the second display panel 211. In other words, it shall be evident to those of ordinary skill in the art that the overlap-removed background image 200R can be formed as a virtual image based on different predetermined optical conditions, such as the type of lens array 212.

The conventional method has an overlapping region, in which the object image 290 and the background image 200 are overlapped, distorting the color of the object image. Therefore, as described with reference to FIG. 2, the second display panel 211 of the present invention outputs the overlap-removed background image 200R, in which the area corresponding to the object image 290 is removed from the background image 200.

To prevent any overlapping region from occurring when the user views the overlap-removed background image 200R, the area that is overlapped by the object image 290 is obtained by the input panel 210. The second display panel 211 can be connected to the input panel 210 or include the input panel 210 such that the overlap-removed background image 200R picked up by the input panel 210 can be outputted.

As described above, in the 3D image display system of the present invention, the user recognizes that the space shuttle is placed at the distance of L behind the mirror and the earth is placed at the distance of Z1-Z2 behind the space shuttle. Therefore, the user can three-dimensionally recognize the earth 200R and the space shuttle 290 seen from the space.

Figure 4:
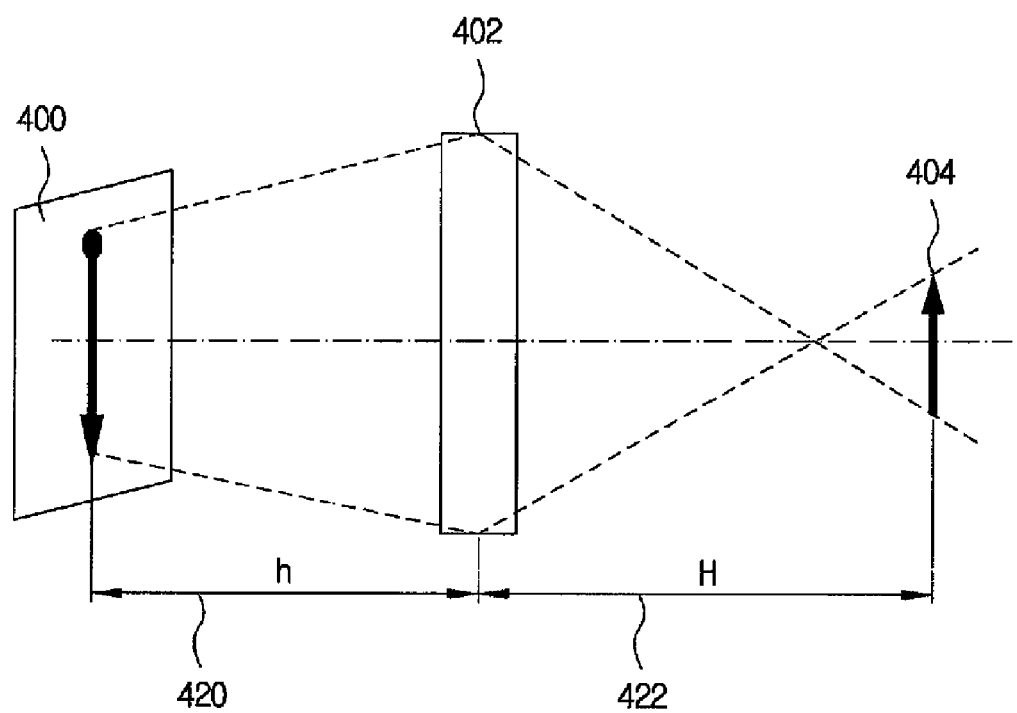
FIG. 4 shows how a floating-image display method works.

FIG. 4 shows how a floating-image display method works. The floating-image display method is used to display the object image described with reference to FIGS. 1 to 3.

Referring to FIG. 4, a floating-image display device includes a display panel 400, for displaying an image, and a convex lens 402. Two or more convex lenses 402 can be combined in order to reduce the focal length. It is also possible that the convex lens 402 is substituted by a concave mirror. The convex lens can be a Fresnel lens.

An image being displayed on the display panel 400 can have the same resolution as that of the display panel 400. A high-resolution object image displayed on the display panel 400 gets displayed as an object image 404 in space through the convex lens 402. Here, if the distance between the display panel 400 and the convex lens 402 is defined as h 420, and the focal length of the convex lens as fl, the distance H 422 to the location on which the object image 404 is displayed from the convex lens 402 is defined as the following formula (1).

$$H = \frac{hf_1}{h - f_1} \quad (1)$$

The object image 404 gets displayed at the distance H 422 calculated by the formula (1), which summarizes the floating-image display technology, which forms an image in the space.

Figure 5:
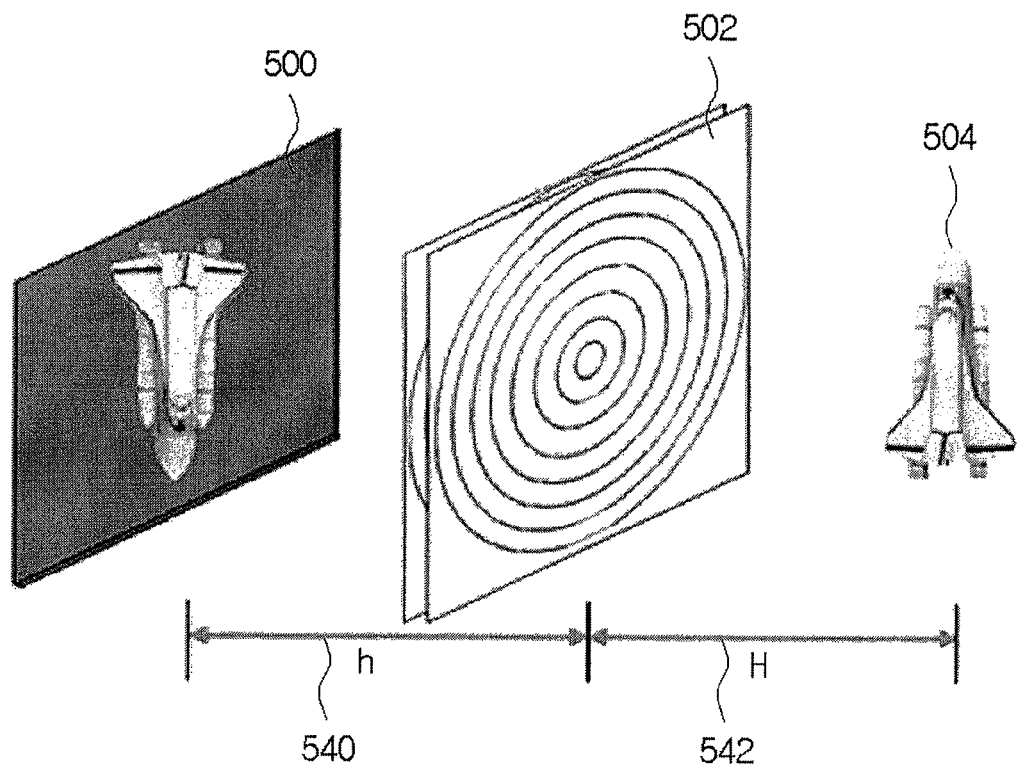
FIG. 5 shows a floating-image display method in accordance with an embodiment of the present invention works.

FIG. 5 illustrates a floating-image display system in accordance with an embodiment of the present invention.

Referring to FIG. 5, the floating-image display system is used to display an object image. The floating-image display system unit can include a display panel 500 and a convex lens 502.

There can be two or more convex lenses, in order to reduce the focal length. In another embodiment, a concave mirror can be used instead of the convex lens 502 to float the object image.

The object image to render is displayed on the display panel 500. A typical 2D image, this object image can be displayed in the same resolution as that of the display panel 500. Once the high-resolution object image is displayed on the display panel 500, the object image (i.e., space shuttle) 504 is displayed in space through the convex lens 502.

In other words, the 2D space shuttle shown on the display panel 500 is displayed as the actual object image 504 through the convex lens 502 at a distance H 542 from the convex lens 502.

Here, the location H, on which the actual image is formed, can be calculated using a lens formula. Defining that the distance between the display panel 500 and the convex lens 502 is h 540 and that the focal length of the convex lens is fl, the location H 542, on which the object image 504 is formed, is defined as the lens formula (1).

Figure 6:
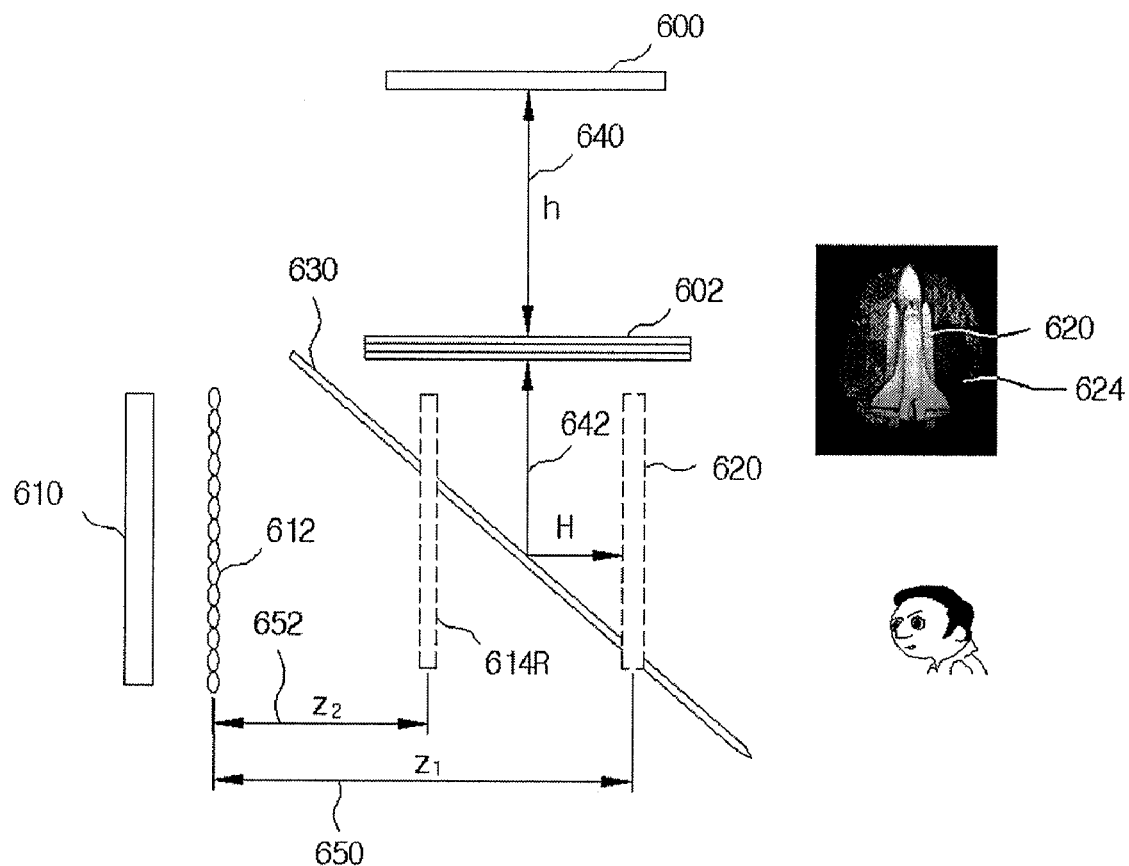
FIG. 6 shows the structure of a 3D image display system in accordance with another embodiment of the present invention.

FIG. 6 is the structure of a 3D image display system in accordance with another embodiment of the present invention.

The display system illustrated in FIG. 6 forms an object image by use of a floating lens 602.

Referring to FIG. 6, the 3D image display system consists mainly of two system units, one of which is a floating display system unit and the other an integral image display system unit. The floating display system unit corresponds to the object image display system unit.

Here, the two system units can place the object image at a close distance and the background image at a far distance such that the object image and the overlap-removed background image are overlapped within the same viewing angle through a translucent mirror 630.

For this, the translucent mirror 630 allows one of the object image 620, displayed from the floating-image display system unit, and the overlap-removed background image 614R, displayed from the integral image display system unit, to pass through and the other to reflect. Although FIG. 6 illustrates that the user is looking at the translucent mirror 630 from the right side, it shall be evident that it is possible for the user to view the translucent mirror from the lower side. Hereinafter, however, the case of the user viewing the translucent mirror 630 from the right side will be described, for the convenience of description and understanding. In FIG. 6, however, the object image 620 is reflected and the overlap-removed background image 614R permeates to be projected to within the viewing angle of the user, who is located on the right side.

The floating-image display system unit can include a first display panel 600 and a convex lens 602. The first display panel 600 displays an object image in 3D. The 3D image that appears on the first display panel 600 is displayed as an actual object image 620 near the translucent mirror 630 through the convex lens 602. This will not be described here since this has been already described with reference to FIGS. 4 and 5.

The integral image display system unit can include a second display panel 610 and a lens array 612. The second display panel 610 displays a background image (the globe) as the overlap-removed background image (i.e., the globe, from which the space shuttle is removed). The background element image outputted from the second display panel 610 is displayed as the overlap-removed background image 614R near the translucent mirror 630 through the lens array 612. Although the overlap-removed background image 614R is distanced by Z2 from the lens array 612 in FIG. 6 for the convenience of illustration, it is also possible that the overlap-removed background image 614R is formed as a virtual image, depending on the radius of curvature or the location of the second display panel 610. This has been already described with reference to FIGS. 2 and 3.

The 3D image 620 being displayed in accordance with an embodiment of the present invention has a very different property from the conventional floating-image display system. That is, the 3D image 620 being displayed in accordance with an embodiment of the present invention includes two major images, one of which is the object image 620 displayed by the floating-image display method and the other the integral image background 614R displayed by the integral image display method.

The object image 620 is the image to which viewers pay attention, and requires high resolution. For this reason, the object image 620 can be displayed using the floating-image display method. On the other hand, the integral image background 614R is for providing three-dimensionality and thus can be displayed using the integral image display method.

By using the integral image background 614R displayed through the integral image display technology, the present invention can provide an image that can be viewed from multiple points of view and can render a deep sense of three-dimensionality by using the overlap-removed background image 614R combined with a mask of the object image.

In addition, the present invention provides high resolution in the object image 620 by displaying the object image 620 through the floating-image display technology to overcome the problem of low resolution, which has been a problem for the integral image display method.

This system can also specify the location where the 3D image 620 is displayed. The floating-image display system unit can use the formula (1) to place the object image at a distance Z1 650 and can use the translucent mirror 630, which reflects the displayed object image. The integral image display system unit places the integral image background at a distance Z2 652.

Hitherto, the general structure of a 3D image display system with a background image using an integral image display method in accordance with an embodiment of the present invention has been described. Hereinafter, the conditions and data from an experiment, to which the 3D image display system with a background image using the integral image display method in accordance with an embodiment of the present invention, will be described.

Figure 7:
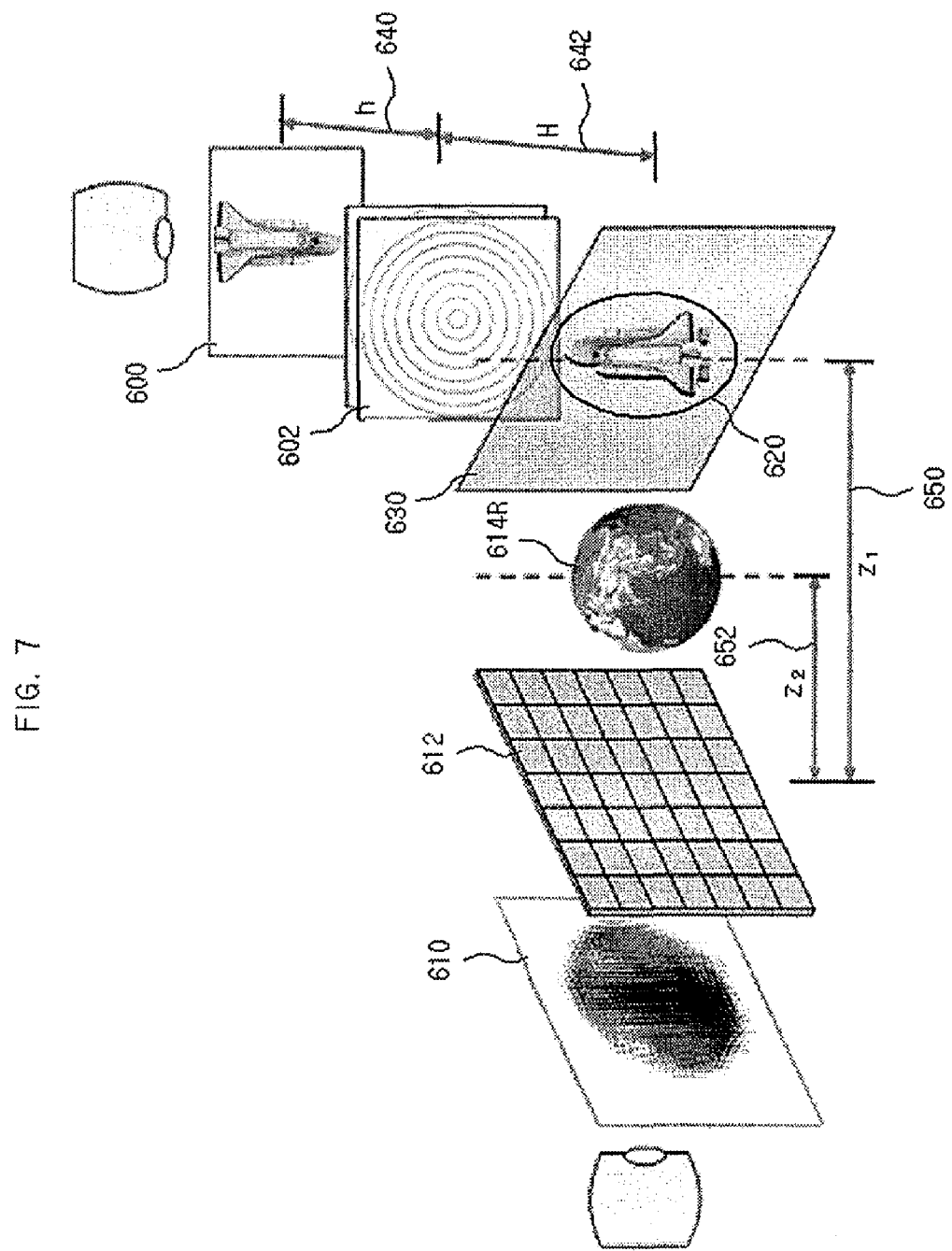
FIG. 7 shows an experimental structure of a floating-image display method having an integral image background in accordance with an embodiment of the present invention.

FIG. 7 shows an experimental structure of a floating-image display method having an integral image background in accordance with an embodiment of the present invention.

The floating-image display system unit is shown on the upper side, and the integral image display system unit is shown on the lower side. The translucent mirror 630 is placed between these two system units such that the images displayed by these two system units are combined for the viewer to see.

In the floating-image display system unit, the object image is displayed on the first display panel 600, which can be a projector and a diffusion screen. The projector and diffusion screen are used for a basic experiment and can be obviously substituted by another display device, such as an LCD (liquid crystal display) and a PDP (plasma display panel), depending on the use and properties, as described above.

Used for the convex lens 602 is a Fresnel lens, which can realize a reduced focal length easily. The convex lens 602 is placed 680 mm away from the diffusion screen. In other words, the distance h 640, between the first display panel 600 and the convex lens 602, is 680 mm. According to the formula (1), the object image (i.e., the space shuttle) 322 is formed 254 mm away from the convex lens 602. That is, the location H 642, on which the object image 622 is formed, is 254 mm from the convex lens 602.

The integral image display system unit displays the element image on the second display panel 610, which can be a projector and a diffusion screen. The lens array 612 is placed in front of the second display panel 610.

The lens array 612 used in the experiment consists of 53×53 of lenslets, the focal length of which is 3 mm.

By making the distance between the second display panel 610 and the lens array 612 identical to the focal length of the lenslet, the background image 614R of the earth, being displayed as the overlap-removed background image, is displayed 6 mm away, which is indicated as Z2 652.

Figure 8:
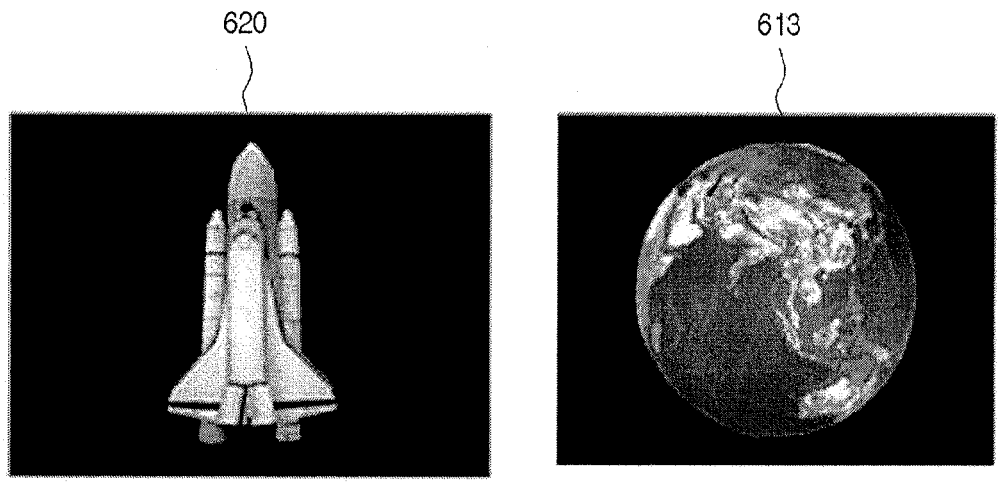
FIG. 8 shows an object image and a background image used in the experiment of a 3D image display method having an integral image background in accordance with an embodiment of the present invention.

FIG. 8 shows an object image and a background image used in the experiment of a 3D image display method having an integral image background in accordance with an embodiment of the present invention.

To perform an experiment for proving the usefulness of the present invention, an object image and an overlap-removed background image are created. Referring to FIG. 8, the experiment used a space shuttle as the object image 620 and the earth as the background image 613. The object image is displayed on the first display panel 600, without any modification. The background image 613 must be modified to the overlap-removed background image 614R before being displayed on the second display panel 610. The process for creating the overlap-removed background image has been described above with reference to FIG. 2.

Figure 9:
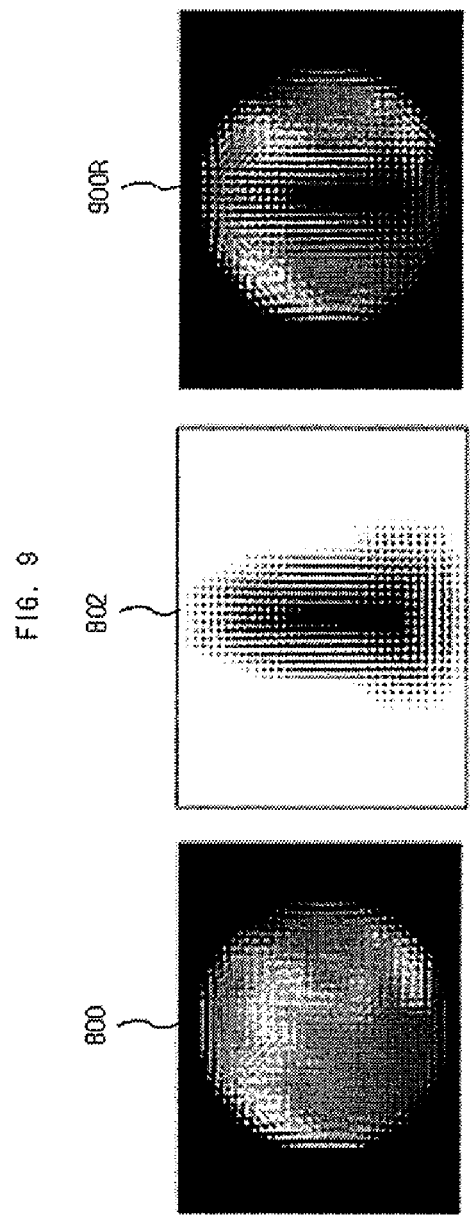
FIG. 9 shows the creation of an overlap-removed background image used in an integral image display system unit in accordance with an embodiment of the present invention.

FIG. 9 shows the creation of an overlap-removed background image used in the integral image display system unit in accordance with an embodiment of the present invention. The method of creating the overlap-removed background image that is projected from the second display panel 610 has been described above. Moreover, as described above, it shall be evident that the overlap-removed background image is recognized through the lens array 612 or 212 by the user as a three-dimensional image.

Illustrated in FIG. 9 is an example of creating the overlap-removed background image to be used in the integral image display system unit.

Firstly, the three images have been inputted and stored in input means 210 through the lens array 612 or 212. That is, the three images are three-dimensional "element images" as multi-view integral images through the lens array.

As described with reference to FIGS. 1 and 2, in the background element image of these element images, an object is passed through a lens array and reproduced by use of a computer pick-up method. Therefore, the background element image in accordance with an embodiment of the present invention consists of 52×52 elements.

In this example, a background element image 800 and an element image 802 of the mask image (silhouette), from which the object of the object image is treated in black, can be combined to produce an overlap-removed background image 900R. As illustrated in FIG. 9, the overlap-removed background image 900R is picked up and reproduced through the lens array 612 or 212, and thus is an "element image."

As described with reference to FIGS. 1 and 2, this is for eliminating any overlapping region by removing the element image 802 of the object image from the background element image 800.

Therefore, the overlap-removed background images 200R and 614R, described with reference to FIGS. 3 and 6, are "element images" of the integral image system unit, and are identical to the image represented by 900R in FIG. 9.

Figure 10:
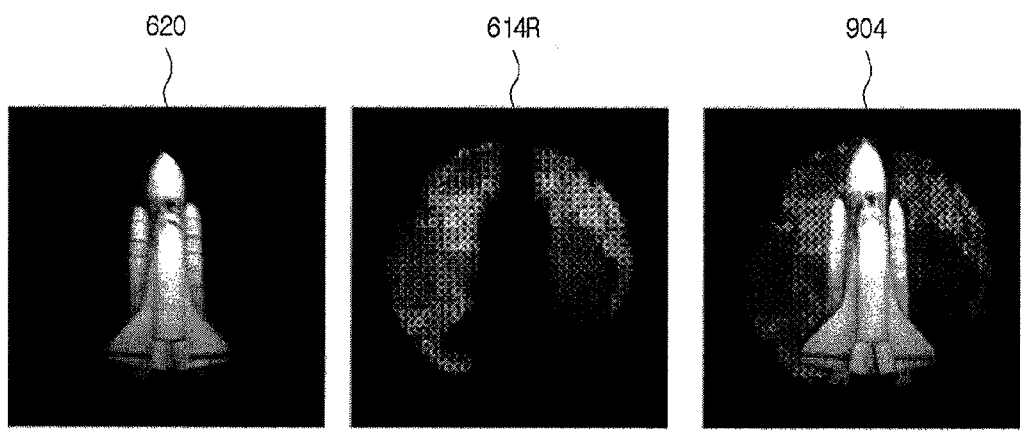
FIG. 10 shows a 3D image generated by the 3D image display method in accordance with an embodiment of the present invention.

FIG. 10 shows the 3D image generated by the 3D image display method in accordance with an embodiment of the present invention.

Using the object image 620 projected from the first display panel 600 and the overlap-removed background image projected from the second display panel 610, in accordance with the experiment conditions of FIG. 7, an experiment for the floating-image display method with an integral image background in accordance with an embodiment of the present invention has been performed.

Images from the actual 3D image display experiment can be found in FIG. 10. The left image 620 is the case of displaying the object image only, and the middle image 614R is the case of displaying the overlap-removed background image only. The right image 904 is the case of displaying the object image with the overlap-removed background image.

In more detail, images in FIG. 10 are resulted from the structure shown in FIGS. 6 and 7, in which two kinds of images are created. The image 620 displaying the object image only is created by the floating-image display system unit. In this experiment, an XGA projector is used, and the space shuttle image has a resolution of about 600×400 pixels. The image displaying the overlap-removed background image only is created by the integral image display system unit. The integral image background 624 has a resolution of about 50×50 pixels, which is identical to that of the lens array 612.

The image 904 that displays the object image and overlap-removed background image together is an image in which the image displayed by the floating-image display system unit and the image displayed by the integral image display system unit are combined through the translucent mirror 630. As seen in FIG. 10, a three-dimensional image can be created by combining the images from two different systems. It can be also seen that the image 620 (i.e., the object image) displayed by the floating-image display method has a much higher resolution than the image 614R (i.e., the overlap-removed background image) displayed by the integral image display system.

Figure 11:
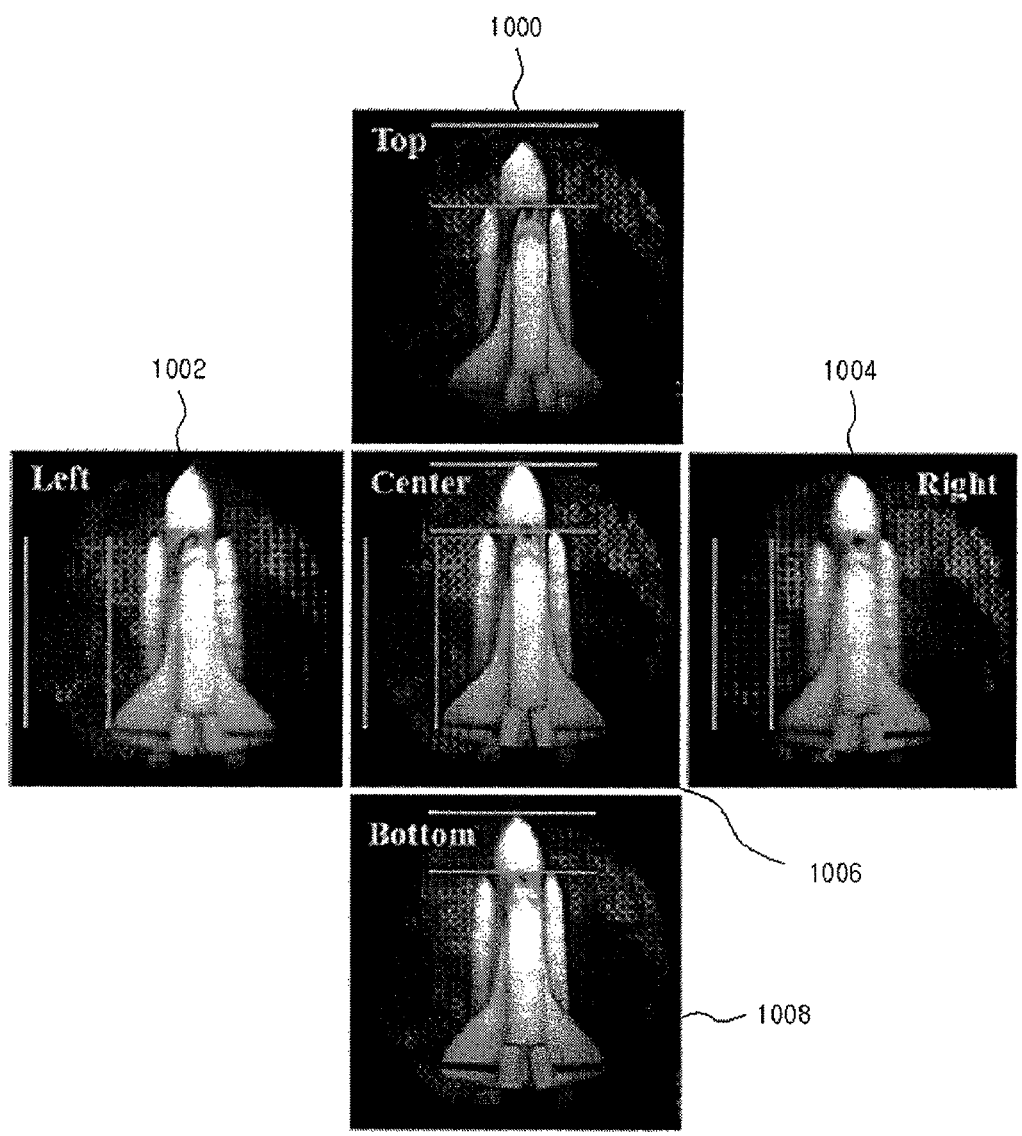
FIG. 11 shows 3D images, viewed from different angles, of a floating-image display having an integral image background in accordance with an embodiment of the present invention.
Figure 12:
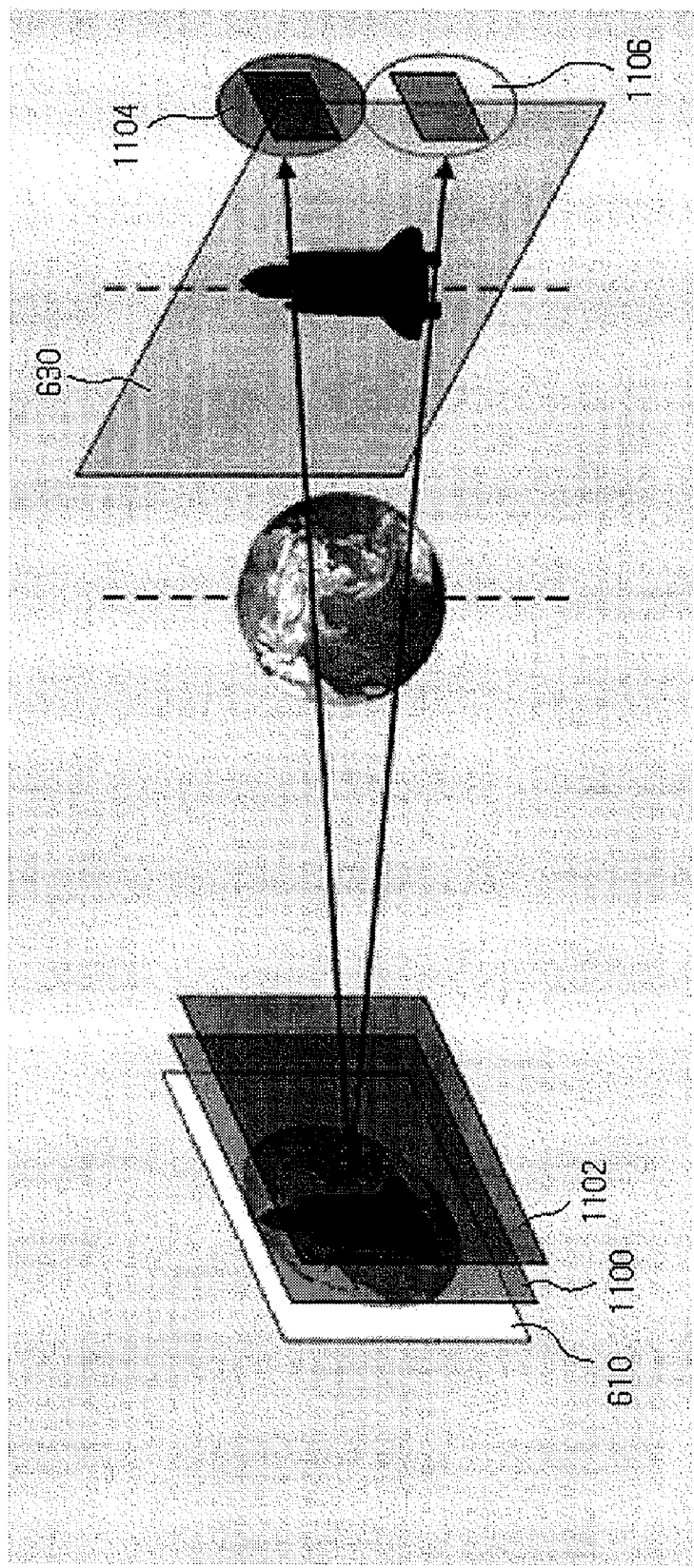
FIGS. 12 to 14 show how the background image is displayed using a stereoscopy method.

FIG. 11 shows 3D images, viewed from different angles, of a floating-image display having an integral image background in accordance with an embodiment of the present invention. Here, the displayed result is viewed from various angles. Shown in FIG. 11 are a three-dimensional image 1000 viewed from the top, a three-dimensional image 1002 viewed from the left, a three-dimensional image 1004 viewed from the right, a three-dimensional image 1006 viewed from the center and a three-dimensional image 1008 viewed from the bottom.

Specifically, comparing the three-dimensional image 1000 viewed from the top and the three-dimensional image 1008 viewed from the bottom with the three-dimensional image 1006 viewed from the center, it can be seen that there is more room around the nose section of the spaceship of the three-dimensional image 1000 viewed from the top.

Likewise, comparing the three-dimensional image 1002 viewed from the left and the three-dimensional image 1004 viewed from the right with the three-dimensional image 1006 viewed from the center, it can be seen that there is more room on the left side of the spaceship of the three-dimensional image 1002 viewed from the left.

It can be seen in FIG. 11 that the background image of the 3D image 620 viewed from different angles has three-dimensionality.

Hitherto, an experiment for a background image using the integral image method has been described. Hereinafter, the background image displayed by other 3D image displaying methods than the "element image" by the lens array will be described.

Figure 13:
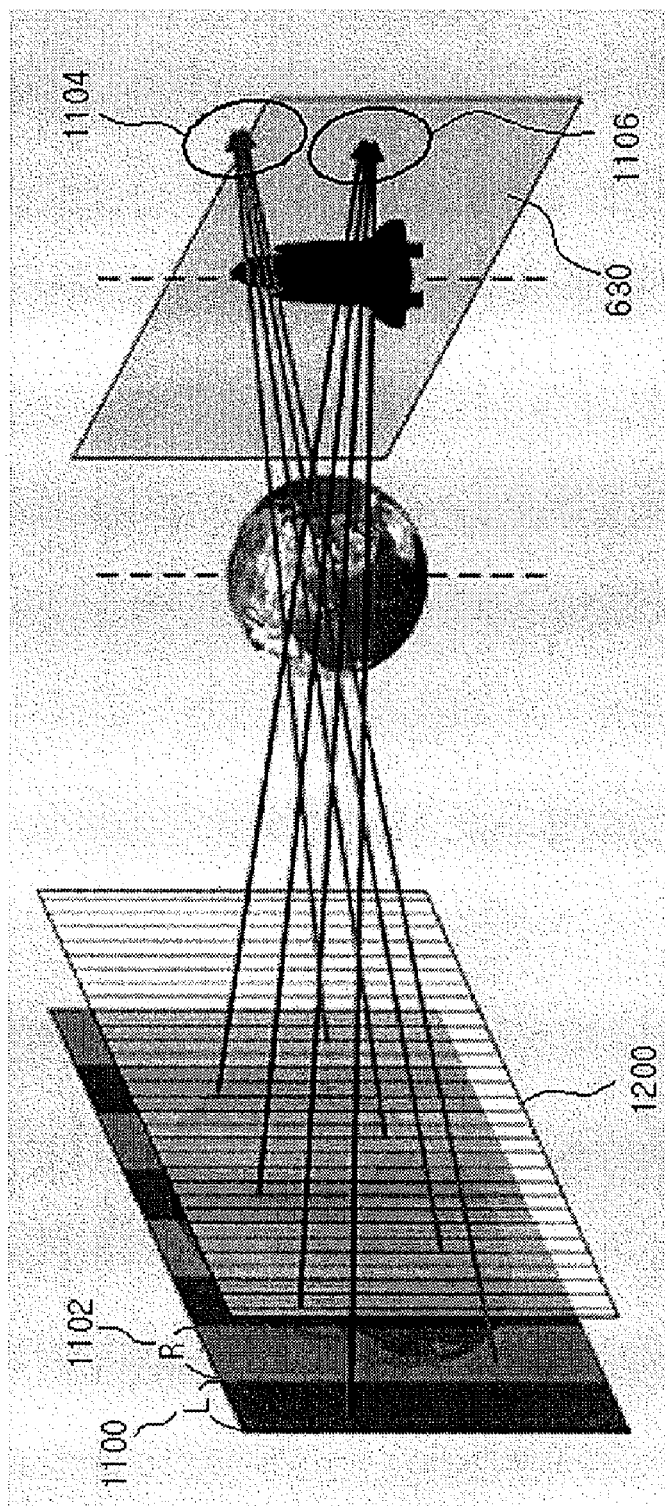
Figure 14:
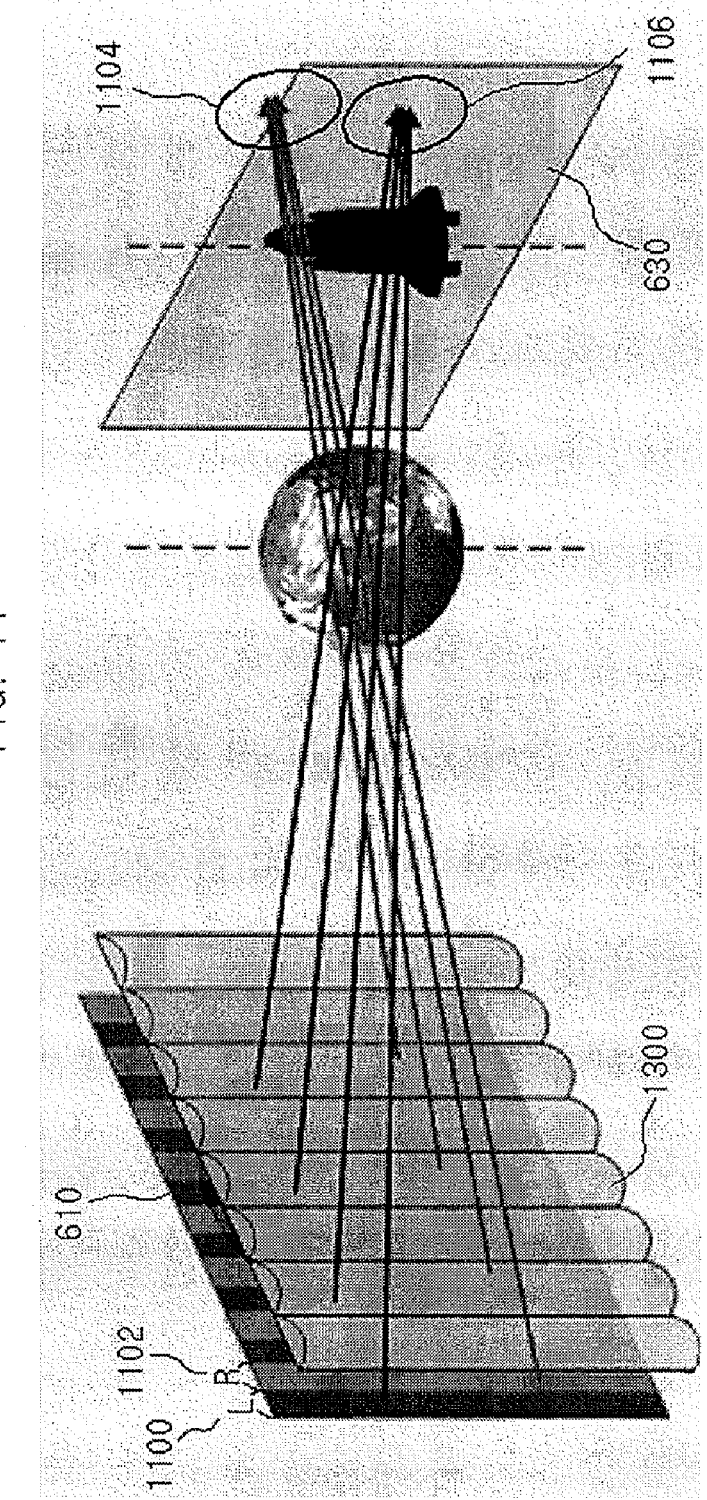

FIGS. 12 to 14 show how the background image is displayed by use of the stereoscopy method.

A virtual 3D display method, the stereoscopy method uses the binocular disparity of human eye to create virtual three-dimensionality on a two-dimensional display space.

On average, human eyes have a 65 mm separation between the right eye and the left eye. This causes the image viewed by the left eye and the image viewed by the right image to have slightly different image information. Once these two images are delivered to the opposite side of the brain through the optic nerves, these images are combined in the visual cortex (the cerebral cortex region where visual information is processed) to give the viewer a sense of three-dimensionality.

In other words, due to the parallax of human eyes, the spatial information of an object perceived by the left eye and the right eye differs slightly. When these two slightly different images are delivered to the brain through the retina, the human brain combines these two images and cognizes the three-dimensionality. The stereoscopy method uses precisely this principle, as a 2D display device displays a left image and a right image, with parallax, and delivers each of these images to the corresponding eye to create virtual three-dimensionality.

The stereoscopy method can be classified into the eye-glasses type and no-glasses type, depending on whether the eye-glasses are to be worn or not, and into the stereoscopic display method and the multiview method, depending on how much variety of angles can be rendered.

The eye-glasses type includes a color difference method, a polarization method, a time-division method and a head mount display (HMD) method.

In the color difference method, the left and right images are separated to red and green, which are complementary colors, and selected by color filters. Thus, the separated images are viewed through the eye-glasses, which have a red lens on one side and a green lens on the other side.

In the color difference method, the left and right images are separated to red and green, which are complementary colors, and selected by color filters. Thus, the separated images are viewed through the eye-glasses, which have a red lens on one side and a green lens on the other side.

In the time-division method, the left and right images are repeatedly shown to the left and right eyes, respectively, periodically. By wearing eye-glasses equipped with an electronic shutter that is synchronized with the period of the repetition, three-dimensionality can be provided to the viewer.

In the HMD method, a display device is placed on the head of the viewer and the images are displayed right in front of the eyes to provide three-dimensionality.

Each of the above methods can be applied to a floating-image display system having a background image. However, use of the polarization method may be restricted because the polarizing direction can affect the floating-image display, and head-mounting of the device in the HMD method also restricts the application of the HMD method because the device can block the view. Therefore, the time-division method may be preferable for a floating-image display system. However, it shall be evident that this does not restrict the application to any particular method and that any of the above methods may be applied to display the background image.

The major no-glasses type includes the parallax barrier method and lenticular method. The no-glasses type does not use glasses but uses the structure of the display device and the refraction of lens to separate an image for the left eye and right eye.

Hereinafter, some of the embodiments for displaying a background image using each of the methods.

FIG. 12 shows how the background image is displayed using the time-division method in accordance with another embodiment of the present invention.

In the time-division method, the images on the left channel and the right channel alternate fast. Shutter glasses, for example, are used to block and unblock the alternately displayed images to deliver one side of the images to the same side of the eyes.

Referring to FIG. 12, the second display panel 310 displays images with different viewing angles at a fast rate. In this particular experiment, a left image 1100 is green and a right image 1102 is blue. The shutter glasses worn by the viewer operate electronically to block the left eye and right eye alternately, in order to provide the image of the same side of the eyes. As this operation is conducted at a rate of 60 times per second, the viewer feels as if the two images are outputted from one screen, and these two images are combined in the viewer's brain to give a sense of three-dimensionality.

In other words, the blue image will be formed on a right eye 1104 of the viewer, and the green image will be formed on a left eye 1106.

Since the time-division method can provide more freedom of viewing angle and the left and right channels are simply outputted alternately on the same screen, there is no loss of image from any viewing angle, including the top, bottom, left and right side. Therefore, the viewer can be much freer to choose the viewing position to watch the virtual 3D image.

FIG. 13 shows how the background image is displayed using the parallax barrier method in accordance with another embodiment of the present invention.

The parallax barrier method does not use an optical technology but rather uses a structure that is similar to a screen to separate an image.

In the parallax barrier method, images for the left eye and right eye are alternately arranged at a specific interval in the back of the openings of narrow slits, called parallax barrier 1200. If the images are viewed through these openings from a particular point, the left image and right image can be precisely separated and viewed. That is, without using an optical technology, such as the polarization method, the parallax barrier method simple separates an image by blocking the left and right channels.

Referring to FIG. 13, the left image 1100 and the right image 1102 are alternately arranged on the second display panel 310. In this particular experiment, the left image 1100 is made green, and the right image 1102 is made blue. The parallax barrier 1200, which is an array of narrow slit, is placed in front of the second display panel 310, and the two images are separately delivered to the left eye and the right eye, respectively, of the viewer, who is positioned at a specific distance. In other words, the blue image is formed in the right eye 1104 of the viewer, and the green image is formed in the left eye 1106 of the viewer.

FIG. 14 shows how the background image is displayed using the lenticular method in accordance with another embodiment of the present invention.

In the lenticular method, the left image and right image, which are refracted through a lenticular lens array 1300 on a vertically arranged screen, are sent to the viewer's respective eyes. Referring to FIG. 13, the second display panel 310 is arranged with the left image 1100 and the right image 1102, which are to enter the respective eyes, on a single lenticular lens. In this experiment, the left image 1100 is made green, and the right image 1102 is made blue. By placing the lenticular lens array 1300 in front of the second display panel 310, the left image 1100 and the right image 1102 are separated and inputted to the left eye 1106 and right eye 1104, respectively. That is, the green image is formed in the right eye 1104, and the green image is formed in the left eye 1106.

The human brain then feels the same sense of three-dimensionality as the conventional 3D display method.

The lenticular method has less loss of brightness than the parallax barrier method, and does not have an unpleasant obstacle, such as a barrier, on the 2D screen.

Figure 15:
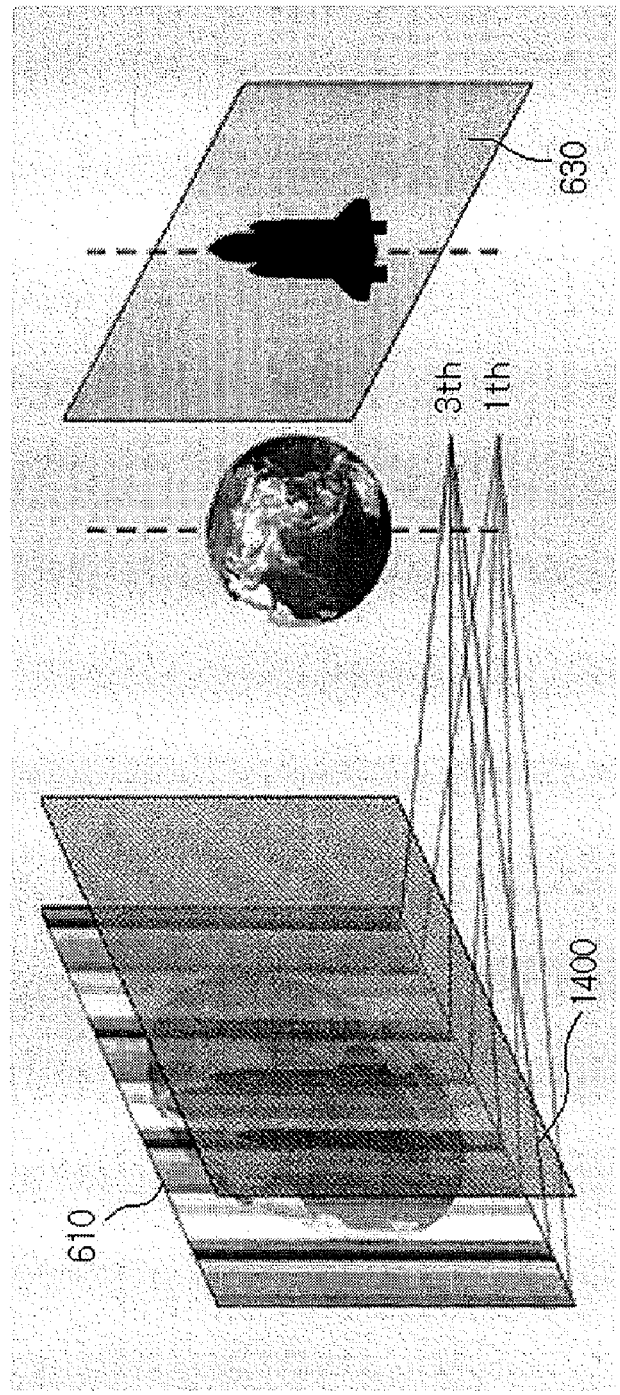
FIG. 15 shows how the background image is displayed using a multi-view method in accordance with another embodiment of the present invention.

FIG. 15 shows how the background image is displayed using the multi-view method in accordance with another embodiment of the present invention.

The multi-view method is what the stereoscopic display method is expanded. In the conventional stereoscopic method, two images inputted to both eyes are recognized as an image of a single point-of-view to provide the sense of three-dimensionality. The multi-view method, however, increases the number of point-of-views to create two or more point-of-views within the same viewing angle.

Referring to FIG. 15, arranged on the second display panel 310 are 5 units (far left image, left image, center image, right image and far right image) of pairs of images of left and right. This seems similar to the conventional barrier method and the lenticular method, but 5 colors, not 2 colors, are arranged for the successive images.

Although an arrangement of 5 point-of-views are described herein for the convenience of description, it shall be evident that it is not limited to 5 point-of-views but any plurality of point-of-views can be applied to the multi-view method. The image created as such passes through a barrier 1400, placed in front of the second display panel 610, and by viewing the image by changing the point-of-views, the 5 images of different point-of-views are seen in the order of viewing, realizing the multi-view display.

To increase the number of point-of-views, it is also possible to structure the barrier 1400 in front of the second display panel 610 at angle of 45 degrees or any other appropriate angle.

Figure 16:
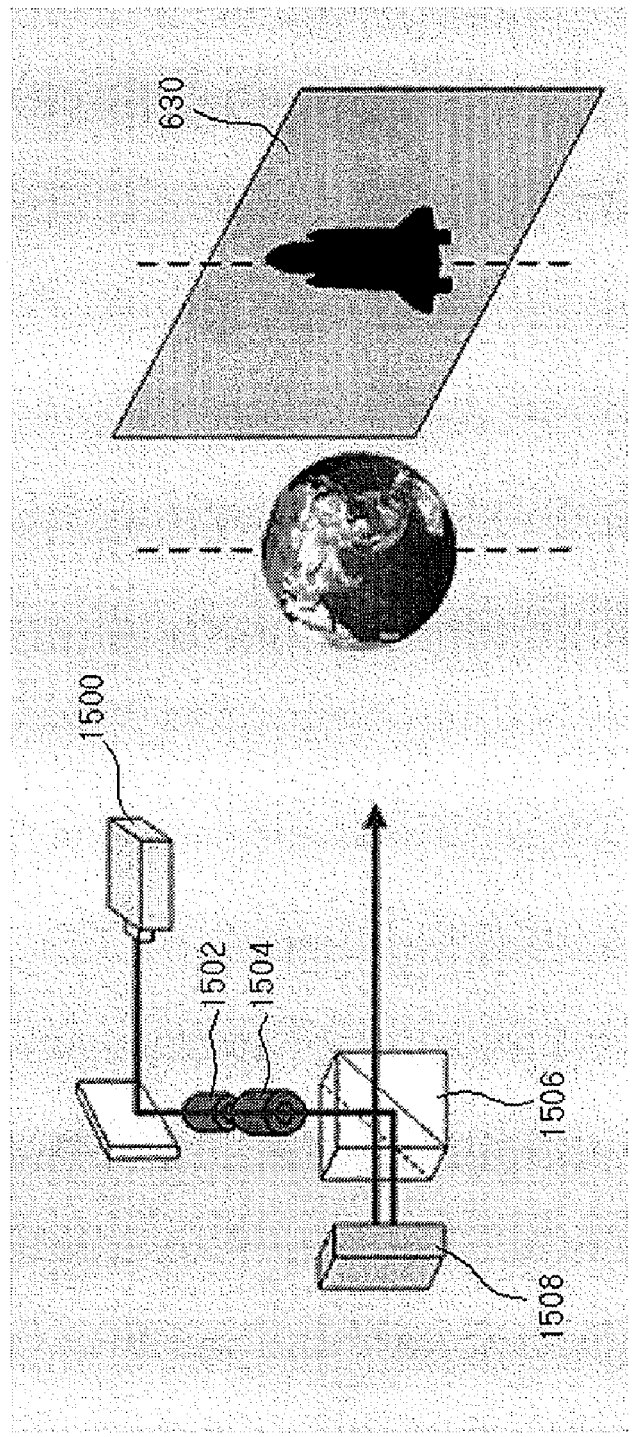
FIG. 16 shows how the background image is displayed using a holography method in accordance with another embodiment of the present invention.

FIG. 16 shows how the background image is displayed using a holography method in accordance with another embodiment of the present invention.

In the holography method, the laser beam is split into two beams, and one of the beams is directly projected to the screen, and the other beam is projected to an object to be seen by the viewer. The beam directly projected to the screen is referred to as a reference beam, and the beam projected to the object is referred to as an object beam.

Since the object beam is reflected on the surface of the object, its phase difference (the distance between the surface and screen) varies depending on the surface of the object. The unmodified reference beam then interferes with the object beam, and an interference pattern is stored in the screen. A hologram is a film in which this interference pattern is stored.

To reproduce the stored image, the beam used during the recording must be projected again on the screen. The beam being used during the reproduction must have the same number of oscillation as the beam used during the recording, in order to reproduce a three-dimensional image. Waves having a different wavelength or phase have no effect and pass through the stored hologram. Therefore, it is important that the beam is precisely identical to the reference beam used during the recording.

The hologram is different from the conventional photo in that the same beam is to be used during the storing and reproduction and that a three-dimensional image is reproduced.

The hologram displays a three-dimensional image because it also stores the direction of the beam while two-dimensional photos store the intensity of the object beam only.

In this particular experiment, the actual hologram pattern is not stored on the screen, but a computer generated hologram (CGH) is used to create the pattern, and a parallel beam is used to diffract the hologram pattern by a spatial light modulator and to display a three-dimensional image in the actual space.

FIG. 16 shows the structure of a hologram display device for displaying a background image. Referring FIG. 16, a beam generated by a laser 1500 passes through an optical collimator 1502 and an optical expander 1504 and becomes a parallel beam. This beam is then entered to a spatial light modulator (SLM) 1508 through a polarized beam splitter (PBS) 1506. The SLM used here can be a reflective SLM or a transmissive SLM. The SLM 1508 is inputted with the generated hologram pattern, and the beam diffracted out from the SLM 1508 is visible as a three-dimensional hologram image through a field lens.

Hitherto, methods for displaying the background image of the floating display system having a background image have been described by referring to FIGS. 12 to 16. It shall be evident to anyone skilled in the art that any method that can reproduce a three-dimensional image, besides the display methods described above, can be used to display the background image. Hereinafter, the floating-image display system using the conventional Fresnel lens will be described.

Figure 17:
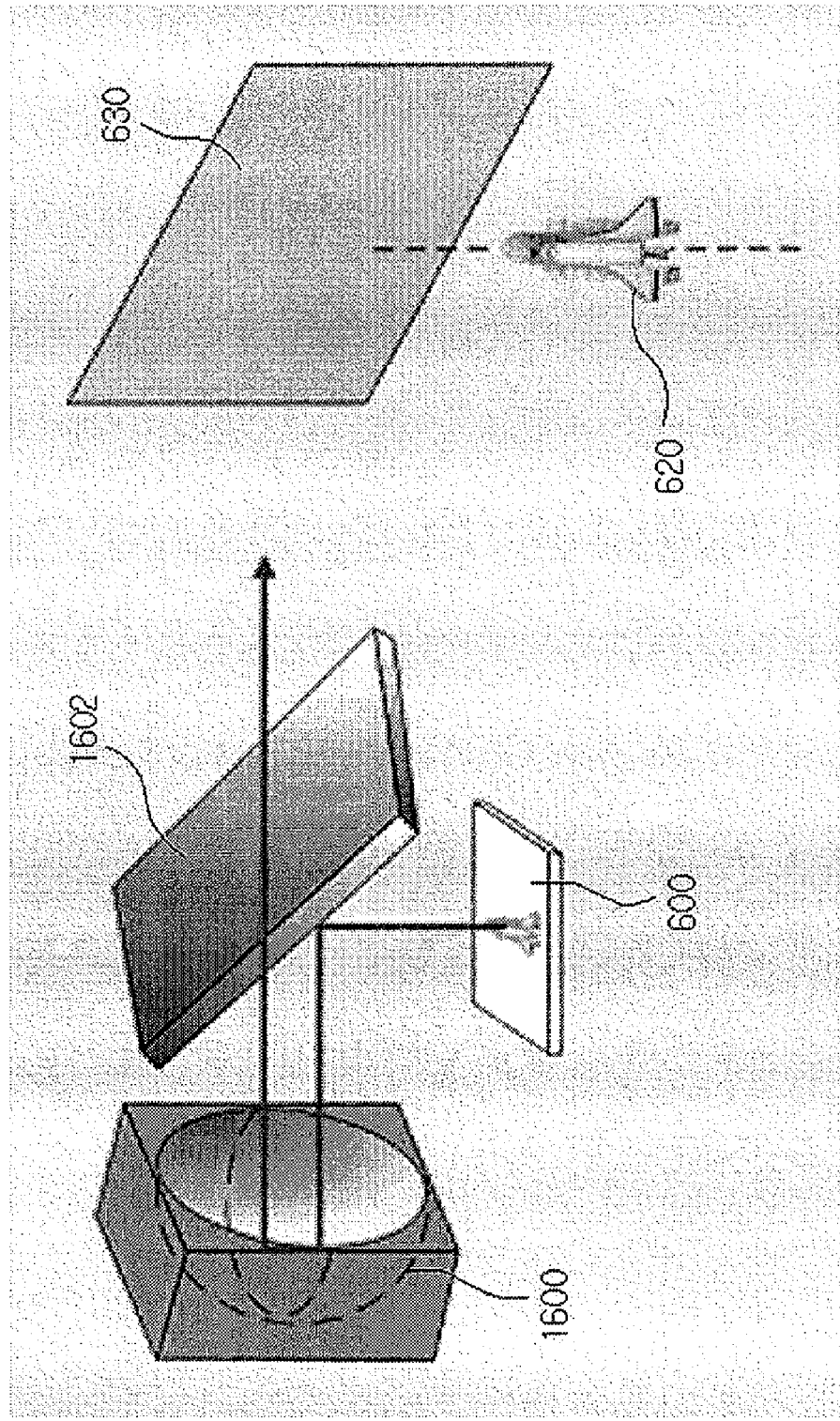
FIG. 17 shows a floating-image display method in accordance with yet another embodiment of the present invention.

FIG. 17 shows a floating-image display method in accordance with another embodiment of the present invention.

In the floating-image display system described above, the two-dimensional image outputted from the first display panel 600 is formed on the screen, and this image is passed through a convex lens and is displayed, through the lens formula, at the same location as the mask image of the object image, which is near the translucent mirror.

Referring to FIG. 17, the system is equipped with a concave mirror, instead of the convex lens, in the floating-image display system unit.

As described already, the floating-image display system unit can include either a convex lens or a concave mirror 1600, which has similar optical properties as the convex lens. The concave mirror 1600 is used here in order to effectively overcome some of the problems caused by using the convex lens.

Since the concave mirror 1600 has the same optical effect, through its curvature, as the convex lens but reflects the image formed on the first display panel 600 while the convex lens transmits the image, the problems of reduced brightness, distortion and aberration, which are caused by using the convex lens, can be improved.

Referring to FIG. 17 more specifically, the two-dimensional object image is outputted from the first display panel 600 and reflected by a newly-added translucent mirror 1602 before entering the concave mirror 1600. The entered image is affected by the optical property of the concave mirror 1600 caused by the curvature (i.e. the optical property of passing through the convex lens), and the image reflected by the concave mirror is outputted to the opposite direction of incident. Finally, the object image 620 is displayed in the real field of a focal length, which is defined by the distance of the concave mirror 1600, through the translucent mirror 1602, like the distance of the image formed by the lens formula through the convex lens.

All embodiments described above realize the image in the real field, which is a plane that is passed through an optical device. However, the integral display method, floating-image display method and all 3D display methods described above can realize the image in a virtual field, which is the opposite field of the real field, by differing the optical structure or software method of image pick-up. Moreover, by using the virtual field, it is possible that the depth of a wider field is rendered or a new application is found depending on the use, such as modifying the viewing angle.

Although certain embodiments have been described, it shall be evident to anyone who is skilled in the art to which the present invention pertains that there can be a variety of permutations and modifications within the technical ideas and scope of the invention, which shall only be defined by the appended claims.

What is claimed is:

1. A three-dimensional image display method in a three-dimensional image display system, the method comprising:
    generating a mask image corresponding to an object image;
    generating a background image such that a shadow of the mask image is disposed on the background image;
    two-dimensionally displaying the object image;
    three-dimensionally displaying the background image via a lens array; and
    combining the two-dimensional object image and the three-dimensional background image such that the object image is disposed on the shadow of the background image, wherein, in combining the object image and the background image, one of the object image and background image is formed as a real image and the other is formed as a virtual image, by using a half mirror, wherein the half mirror is configured to transmit one of the object image and background image and reflect the other, and wherein the generating of the background image comprises:

disposing the background image between a lens array and the mask image so that the background image overlaps with the mask image; and projecting the mask image and the first background image onto an input panel via the lens array so that the shadow of the mask image is projected on the background image.

2. The method of claim 1, wherein the object image is reflected on the half mirror and is formed as a virtual image on an opposite side of the half mirror.

3. The method of claim 1, wherein the object image is combined with the background image via a translucent mirror so as to overlap with each other within the same viewing angle of a viewer.

4. The method of claim 1, wherein the shadow of the background image is treated black.

5. The method of claim 1, wherein the lens array comprises a convex lens or a concave mirror.

6. The method of claim 1, wherein the lens array comprises a plurality of convex lenses or a plurality of concave mirrors.

7. A non-transitory processor-readable media having processor-readable code, the processor-readable code which, when executed by one or more processors, performs a three-dimensional image display method in a three-dimensional image display system, the method comprising:

generating a mask image corresponding to an object image;

generating a background image such that a shadow of the mask image is disposed on the background image;

two-dimensionally displaying the object image;

three-dimensionally displaying the background image via a lens array; and combining the two-dimensional object image and the three-dimensional background image such that the object image is disposed on the shadow of the background image, wherein, in combining the object image and the background image, one of the object image and background image is formed as a real image and the other is formed as a virtual image, by using a half mirror, wherein the half mirror is configured to transmit one of the object image and background image and reflect the other, and wherein the generating of the background image comprises:

disposing the background image between a lens array and the mask image so that the background image overlaps with the mask image; and projecting the mask image and the first background image onto an input panel via the lens array so that the shadow of the mask image is projected on the background image.

8. A three-dimensional image display system, comprising:

an object image display unit configured to two-dimensionally display an object image;

an integral image display unit configured to i) generate a mask image corresponding to the object image and ii) three-dimensionally display a background image via a lens array such that a shadow of the mask image is disposed on the background image; and an optical unit configured to combine the two-dimensional object image and the three-dimensional background image such that the object image is disposed on the shadow of the background image, wherein the optical unit is further configured to combine the object image and the background image such that one of the object image and background image is formed as a real image and the other is formed as a virtual image, by using a half mirror, wherein the half mirror is configured to transmit one of the object image and background image and reflect the other, and wherein the integral image display unit is further configured to, so as to generate the background image, 1) dispose the background image between a lens array and the mask image so that the background image overlaps with the mask image and 2) project the mask image and the first background image onto an input panel via the lens array so that the shadow of the mask image is projected on the background image.

9. The system of claim 8, wherein the object image display unit comprises:

a display panel configured to display the object image; and a floating lens, which is a convex lens or a concave lens, wherein an image displayed on the display panel is configured to be floating-displayed by being projected to the floating lens.

10. The system of claim 9, wherein the floating lens is a plurality of convex lenses or a plurality of concave mirrors.

11. The system of claim 9, wherein the floating lens is configured to allow the object image displayed on the display panel to be formed at a distance H, the distance H being computed through a formula $$H = \frac{hf_1}{h - f_1},$$

h being the distance between the display panel and the lens, fl being the focal length of the lens, H being the distance of a location on which the object image is formed.

12. The system of claim 8, wherein the optical unit is a half mirror, and wherein the half mirror is configured to transmit one of the object image and background image and reflect the other.

13. The system of claim 12, wherein the half mirror is configured to reflect the object image, whereas the object image is formed as a virtual image on an opposite side of the half mirror.

* * * * *